US011288637B2

(12) United States Patent
Pena et al.

(10) Patent No.: US 11,288,637 B2
(45) Date of Patent: Mar. 29, 2022

(54) SYSTEMS AND METHODS FOR ANALYTICS INTEGRATION INTO ELECTRONIC APPLICATIONS

(71) Applicant: MicroStrategy Incorporated, Tysons Corner, VA (US)

(72) Inventors: Victor Hugo Pena, Falls Church, VA (US); Nida Imtiaz, Vienna, VA (US); Xinrui Bai, McLean, VA (US); Jose Manuel Nocedal De La Garza, Leesburg, VA (US); Hui Yuan, Fairfax, VA (US)

(73) Assignee: MicroStrategy Incorporated, Tysons Corner, VA (US)

( * ) Notice: Subject to any disclaimer, the term of this patent is extended or adjusted under 35 U.S.C. 154(b) by 0 days.

(21) Appl. No.: 17/021,116

(22) Filed: Sep. 15, 2020

(65) Prior Publication Data
US 2021/0081902 A1    Mar. 18, 2021

Related U.S. Application Data

(60) Provisional application No. 62/900,849, filed on Sep. 16, 2019.

(51) Int. Cl.
G06Q 10/10 (2012.01)
G06F 3/0482 (2013.01)
G06F 40/205 (2020.01)
G06F 40/186 (2020.01)
G06F 3/0483 (2013.01)

(52) U.S. Cl.
CPC ....... *G06Q 10/1095* (2013.01); *G06F 3/0482* (2013.01); *G06F 3/0483* (2013.01); *G06F 40/186* (2020.01); *G06F 40/205* (2020.01)

(58) Field of Classification Search
CPC . G06Q 10/1095; G06F 40/186; G06F 40/205; G06F 3/0482; G06F 3/048
See application file for complete search history.

(56) References Cited

U.S. PATENT DOCUMENTS

| 2004/0168171 | A1* | 8/2004 | Comparato | G06F 9/5038 |
| | | | | 718/106 |
| 2010/0095240 | A1* | 4/2010 | Shiplacoff | G06F 3/04842 |
| | | | | 715/784 |
| 2012/0054211 | A1* | 3/2012 | Arsenault | H04N 21/4622 |
| | | | | 707/755 |
| 2015/0180875 | A1* | 6/2015 | Kay | H04L 63/102 |
| | | | | 726/4 |
| 2020/0065307 | A1* | 2/2020 | Roy | G06F 3/04842 |
| 2020/0389317 | A1* | 12/2020 | Dunjic | H04L 41/00 |

* cited by examiner

Primary Examiner — Seth A Silverman
(74) Attorney, Agent, or Firm — Bookoff McAndrews, PLLC

(57) ABSTRACT

According to certain aspects of the disclosure, a computer-implemented method may be used for analytics integration into electronic applications. The method may include providing a request to a user for permission to access electronic data from a schedule application, and receiving from the user permission to access the electronic data. Additionally, the method may include parsing the electronic data, and displaying the electronic data in a second application. Additionally, the method may include creating data cards based on one or more entity terms of the electronic data, and displaying the data cards in the second application based on a user interaction with the one or more entity terms of the electronic data.

20 Claims, 8 Drawing Sheets

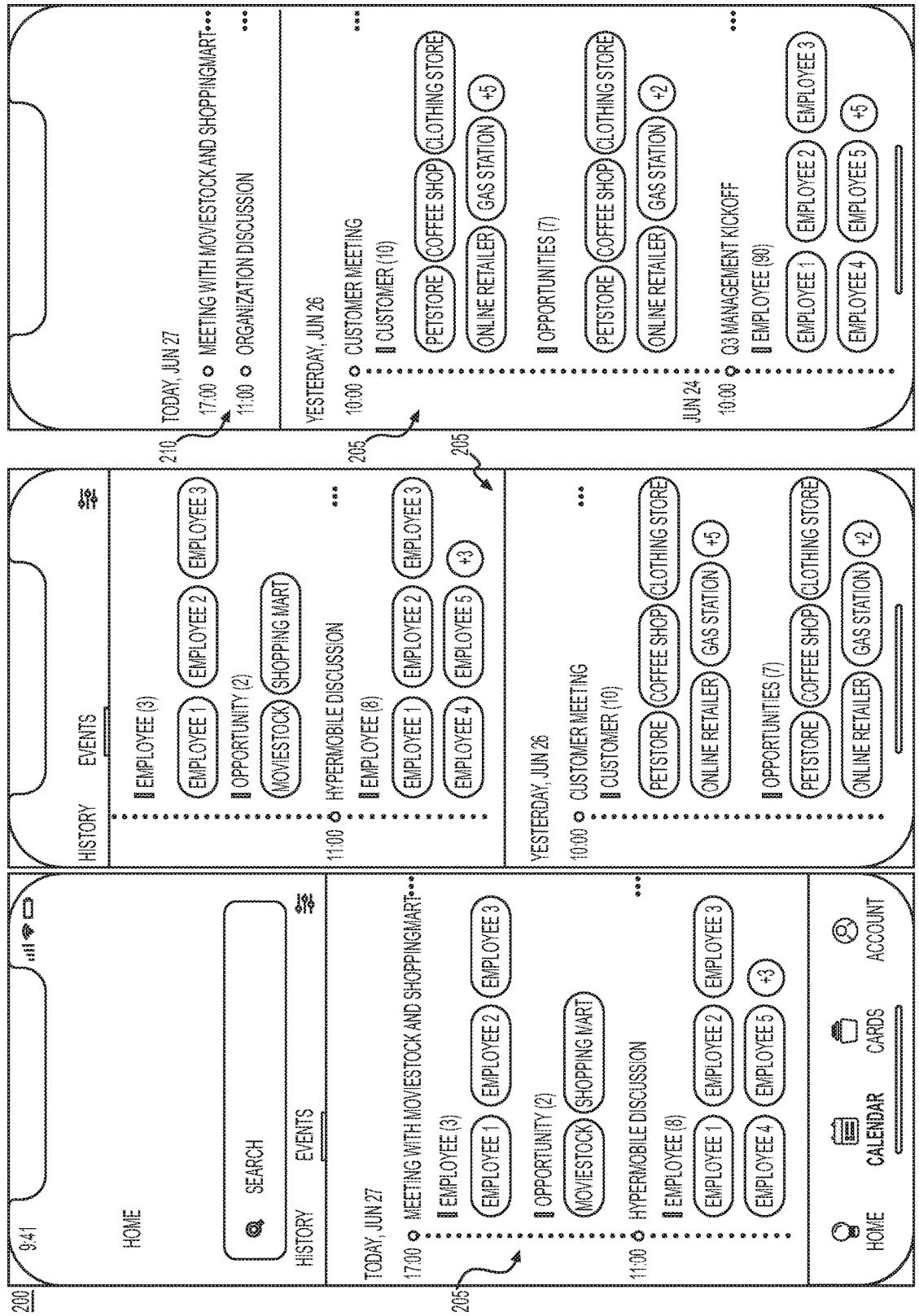

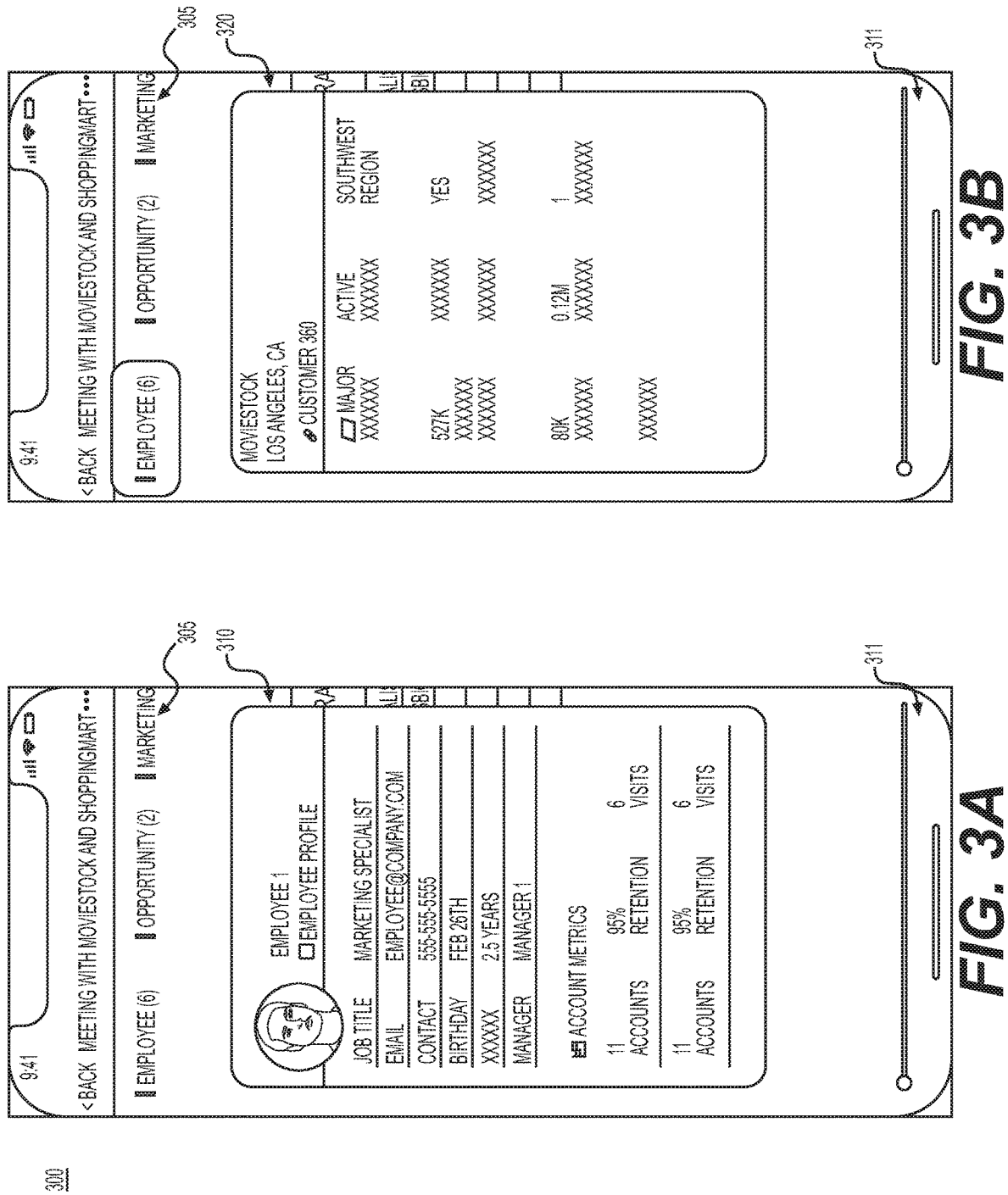

SYSTEMS AND METHODS FOR ANALYTICS INTEGRATION INTO ELECTRONIC APPLICATIONS

CROSS-REFERENCE TO RELATED APPLICATION(S)

This application claims the benefit of priority to U.S. Provisional Application No. 62/900,849, filed Sep. 16, 2019, the entirety of which is incorporated by reference herein.

TECHNICAL FIELD

Various embodiments of the present disclosure relate generally to providing on demand contextually relevant information.

INTRODUCTION

Enterprise employees or professionals often have numerous meetings scheduled per day, and each meeting might have a plurality of attendees with multiple topics. While it may be easier to keep track of all the meetings with the advent of mobile devices it may still be difficult to prepare for the meetings. It may be beneficial for the user to look up information regarding meeting attendees with respect to the relationship of the attendees and the user's organization, and it may be beneficial to the user to look up information regarding the topics of the meeting. However, the sources of the information may be distributed among a plurality of databases and thus create difficulties. As a result, the user may spend an unnecessary amount of time preparing for the meetings. For example, the user may have to switch between multiple applications running on the mobile device to look up data regarding each of the meeting attendees and data regarding meeting topics.

Furthermore, information regarding the attendees and meeting topics may be dynamically updated live data. Therefore, the user preparing for the meetings may be using outdated or stale data and thus may make decisions that may have a negative impact on the user's organization.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more recommendations. Each of the examples disclosed herein may include one or more of the features described in connection with any of the other disclosed examples.

In one example, a computer-implemented method may be used for analytics integration into electronic applications. The method may include providing a request to a user, by a one or more processors, for permission to access electronic data from a schedule application; receiving from the user, by the one or more processors, permission to access the electronic data; parsing, by the one or more processors, the electronic data; displaying, by the one or more processors, the electronic data in a second application; creating, by the one or more processors, data cards based on one or more entity terms of the electronic data; and displaying, by the one or more processors, the data cards in the second application based on a user interaction with the one or more entity terms of the electronic data.

According to another aspect of the disclosure, a computer system for analytics integration into electronic applications may include at least one memory having processor-readable instructions stored therein; and at least one processor configured to access the memory and execute the processor-readable instructions, which when executed by the processor configures the processor to perform a plurality of functions. The functions may include providing a request to a user, by a one or more processors, for permission to access electronic data from a schedule application; receiving from the user, by the one or more processors, permission to access the electronic data; parsing, by the one or more processors, the electronic data; displaying, by the one or more processors, the electronic data in a second application; creating, by the one or more processors, data cards based on one or more entity terms of the electronic data; and displaying, by the one or more processors, the data cards in the second application based on a user interaction with the one or more entity terms of the electronic data.

According to still another aspect of the disclosure, a non-transitory computer-readable medium containing instructions for analytics integration into electronic applications, the non-transitory computer-readable medium storing instructions that, when executed by at least one processor, may configure the at least one processor to perform providing a request to a user, by a one or more processors, for permission to access electronic data from a schedule application; receiving from the user, by the one or more processors, permission to access the electronic data; parsing, by the one or more processors, the electronic data; displaying, by the one or more processors, the electronic data in a second application; creating, by the one or more processors, data cards based on one or more entity terms of the electronic data; and displaying, by the one or more processors, the data cards in the second application based on a user interaction with the one or more entity terms of the electronic data.

Additional objects and advantages of the disclosed embodiments will be set forth in part in the description that follows, and in part will be apparent from the description, or may be learned by practice of the disclosed embodiments. It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A-2C depict exemplary user interfaces for displaying calendar data, according to one aspect of the present disclosure.

FIGS. 3A-3B depict exemplary user interfaces for displaying data cards, according to one aspect of the present disclosure.

DETAILED DESCRIPTION

Figure 1:
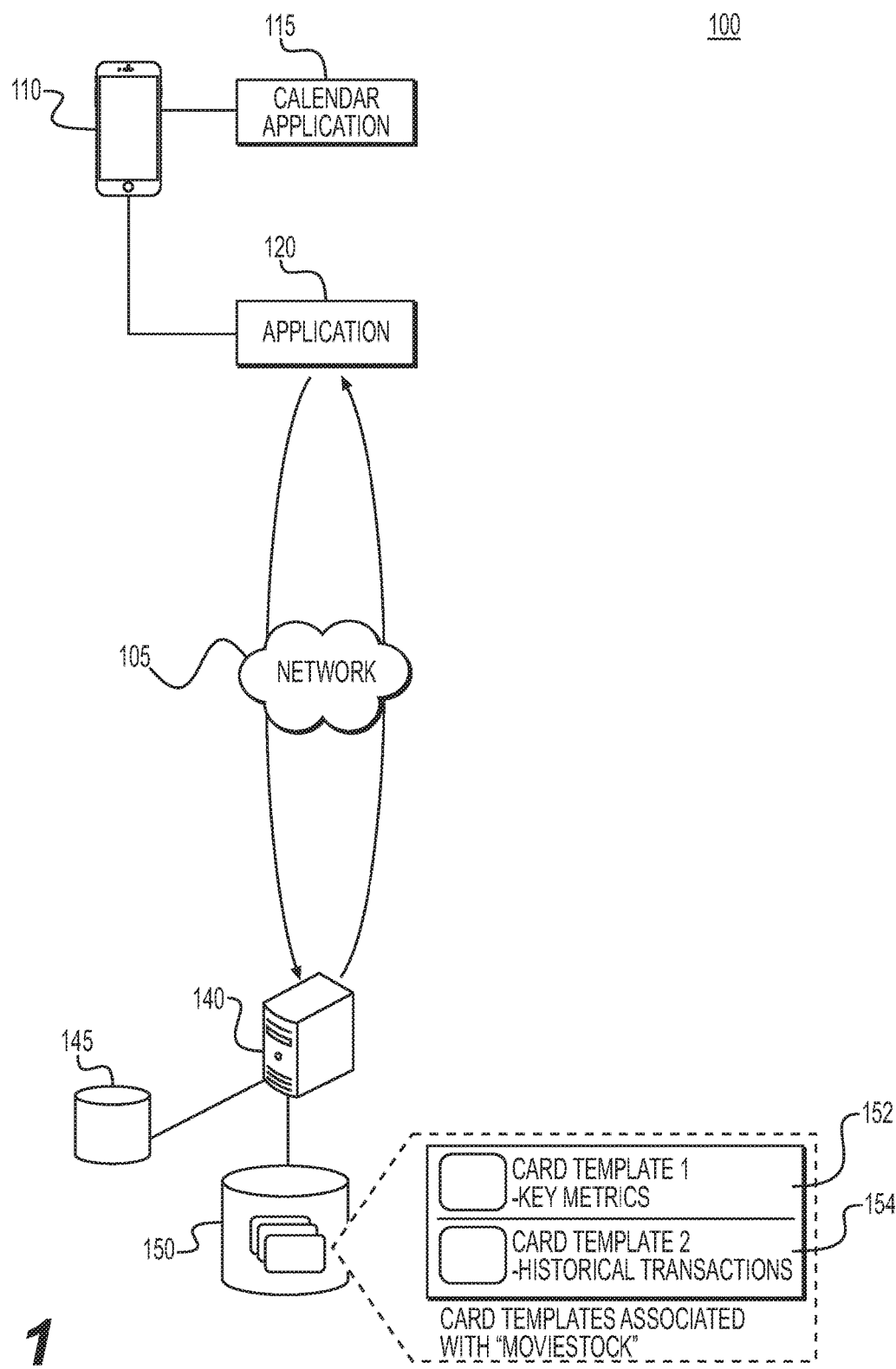
FIG. 1 depicts an exemplary environment in which systems, methods and other aspects of the present disclosure may be implemented.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompany drawings. Various embodiments of the present disclosure relate generally to methods and systems for analytics integration into electronic calendars or other electronic schedules. For example, various embodiments of the present disclosure relate to accessing the calendar data of a user and creating data cards from the calendar data. In some arrangements, location information from the calendar data may be used to enhance related functions.

As described above, professionals and employees of organizations big and small may be inundated with a plurality of calendar entries on a daily basis. Often times those entries involve a plurality of attendees and a number of complex topics. An attendee of the meeting might desire to prepare for the meeting by looking up information regarding the other attendees and the meeting topics. For example, if the meeting topic is regarding a client of the enterprise, the attendee may want to prepare by studying data of the client. To retrieve all the relevant data of the client the attendee may have to switch between several applications that pull data from many sources to acquire sufficient data on the client. Therefore, a need exists to minimize the burden imposed on the user, and to assist the user to reduce the amount of switching between different applications to acquire relevant data. The computing system may provide contextually-relevant information for the calendar entries by monitoring calendar data and creating data cards to display various sources data in one combined format.

Referring now to the appended drawings, FIG. 1 depicts an exemplary environment 100 in which systems, methods and other aspects of the present disclosure may be implemented. Environment 100 may include a user device 110, a calendar application 115 and data card application 120. The calendar application 115 and data card application 120 may be applications that reside on the user device 110 and executable by the user device 110. In another embodiment, the calendar application 115 and data card application 120 may also reside in a remote location (e.g., a cloud service across a network) and application data may be streamed onto the user device 110. Application 120 may interact with an operating system of the client device 110. For example, one or more application programming interfaces (APIs) may be used to obtain various types of content, such as image data and/or text displayed on a screen, image data or text of user interfaces of applications (which may or may not be currently displayed on a screen), device notifications, messages (e.g., e-mails or SMS text messages), calendar data, received radiofrequency beacon messages, and so on.

Environment 100 may further include a server 140. The server 140 may have access to a source database 145 for an organization. The server 140 may communicate to the application 120 and the user device 110 via a network 105. Such network may be any suitable network or combination of networks and may support any appropriate protocol suitable for communication of data between various components in the system environment 100. The network 105 may include a public network (e.g., the internet), a private network (e.g., a network within an organization), or a combination of public and/or private networks. The server 140 may be implemented using multiple computers that cooperate to perform the functions discussed below, which may be located remotely from each other.

The server 140 may also store card templates 150 that identify, for example, the format and structure of the data cards. The specific information that may be displayed in the data cards may be dynamically populated into the templates at the time the cards are determined to be relevant, so that each display of a card includes information generated from up-to-date information from the source database 145. The card templates 150 may also include different templates for different types of entities. For example, template 152 may be used for data cards that display metrics for an organization, and template 154 may be used for data cards that display historical transactions of organizations or entities.

The user device 110 may be operated by one or more users to perform calendar functions. Examples of user device 110 may include smartphones, wearable computing devices, tablet computers, laptops, desktop computers and vehicle computer systems.

Environment 100 may include one or more computer systems configured to gather, process, transmit, and/or receive data. In general, whenever document environment 100 is described as performing an operation of gathering, processing, transmitting, or receiving data, it is understood that such operation may be performed by a computer system thereof. In general, a computer system may include one or more computing devices, as described in connection with FIG. 5 below.

FIGS. 2A-2C depict exemplary user interfaces 200 for displaying calendar data, according to one aspect of the present disclosure. FIG. 2A depicts a user device 110 display screen 205. Display screen 205 may display data card application 120 which retrieves calendar data from calendar application 115. Data card application 120 may first ask the user for permission to access calendar data from the calendar application 115, or the data card application 120 may run as a silent process that periodically monitors calendar data without requiring any user input on the user device 110. The data card application 120 may parse text data included within calendar entries (e.g., text fields representing organizer, attendee, time, location, and title) to determine if the parsed text data includes any entity terms. Entity terms may be terms within calendar data that the data card application 120 recognizes as terms for which contextual information may be pulled from various databases. For example, as displayed on display screen 205, application 120 may retrieve calendar data for a meeting at 17:00 on June 27th with companies MOVIESTOCK and SHOPPINGMART. After parsing the calendar data, the application 120 may recognize entity terms such as names of the attendees to the meeting and the names of the companies. Application 120 may recognize that contextual information is available for the attendees and the companies, and create an actionable user interface to indicate to the user that the entity terms may have data cards associated with them. While FIG. 2A displays the actionable user interface as oval graphics presenting the names of the attendees and companies, any other user interface representation may also be employed by the data card application 120.

FIG. 2B depicts the exemplary user interfaces 200 for displaying data card application 120, according to one aspect of the present disclosure. Data card application 120 may display the same display screen 205 but may allow the user to advance in date to view calendar data that will happen in the future or go back in time to view calendar data that has happened in the past. The user may use a touch interface or via a mouse to scroll the screen forward and backwards to see the relevant information. The data card application 120 may periodically store in cache calendar data and will refresh the display screen 205 with the calendar data only when the user is scrolling through the interface or the data card application 120 may store the calendar data so that the data is always present in the application. The data card application 120 may allow the user to select the display options based on the preference of the user.

FIG. 2C depicts another exemplary user interfaces 200 for displaying data card application 120, according to one aspect of the present disclosure. In FIG. 2C, the data card application 120 interface may be split into collapsed area 210 and expanded area 205. The user may interact with the user interface to collapse an expanded calendar entry, whereby the display may show only the time and subject of the calendar entry, or may expand a collapsed entry whereby the display will show more detailed calendar data such as attendee and company names. For example, in collapsed area 210, calendar entries for the 17:00 meeting with MOVIESTOCK and SHOPPINGMART, and the 11:00 meeting for Organization Discussion are collapsed by the user, and the calendar entries for June 26 and June 24 are in the expanded state in display area 205. The data card application 120 may allow the user to collapse or expand the calendar entries manually, or the application 120 may set the display state based on a user preference. For example, the application 120 may determine that the user habitually collapses calendar entries that have occurred in the past. Subsequently, the application 120 may set that as a user preference, and automatically collapse calendar entries as they occur without further user intervention.

FIGS. 3A-3B depict an exemplary user interface 300 for displaying data cards, according to one aspect of the present disclosure. FIG. 3A may display an exemplary user interface of a details page for the data card application 120 displaying data cards related to the attendees involved in the calendar entries, and may include top menus 305, data cards 310, and bottom scroll menu 311. The user may arrive at the details page in a number of ways. For example, the user may interact with the cardset name in display area 205 (i.e., Meeting with MOVIESTOCK and SHOPPINGMART) and the application 120 may display the first card of the data cards 310 (e.g., EMPLOYEE 1). If the user interacts with a specific display bubble (i.e., MOVIESTOCK), then the application 120 may display the specific card for MOVIESTOCK. The top menu 305 may be horizontally scrollable so that the user may select between different cardsets (e.g., Employee, Opportunity, Marketing). The application 120 may by default select the first card of the set of data cards 310 when a cardset is selected, the application 120 may also remember the last data card viewed within a set of data cards 310 so that when the user switches between cardsets the application 120 presents the last viewed data card to the user. The bottom scroll menu 311 may allow the user to scroll through the data cards within a set of data cards 310, similarly the user may interact with the data cards to scroll between different data cards. FIG. 3B depicts an exemplary user interface of a details page for the data card application 120 displaying data cards related to the organizations involved in the calendar entries. (i.e., MOVIESTOCK) and may include the same top menus 305, data cards 320, and bottom scroll menu 311 as FIG. 3A.

The data cards 310 and 320 from FIGS. 3A and 3B may be generated by the server 140 to be displayed on the user device 110. The server 140 may retrieve information stored in the source database 145 corresponding to the entity term (e.g., employee or opportunity). The server 140 may also select a card template from among the set of pre-defined card templates 150 for generating the data card. The set of card templates 150 may include different types of cards, e.g., cards with different combinations of information fields for the same entity information. The server 140 may select the card template to be used to generate the information based on different factors, such as the type of event represented by the calendar data, context data collected on the user device 110 in association with the calendar entry, or a time of day associated with the calendar entry.

In FIG. 3B, the server 140 may select card template 152, which may include key transaction metrics for the entity MOVIESTOCK, for generating the data card. This selection may be based on the event title of the calendar entry indicating that the meeting is regarding the organization MOVIESTOCK. The server 140 may determine that the key metrics displayed in card template 152 are more likely to be of interest to the user of the user device 110 during the calendar appointment compared to the historical transactions included in the calendar template 154.

The server 140 may dynamically access information stored in the source database 145 so that the information displayed on the data cards 310 and 320 represent up-to-date data metrics at the time of card generation. To accomplish this, the server 140 may identify information fields that may be included in the selected card template 152, identify corresponding values for the information fields in the source database 145, and insert the identified values in the information fields. In this manner, the server 140 may reduce the likelihood that the data cards include obsolete or outdated information when presented on the user device 110.

Figure 4A:
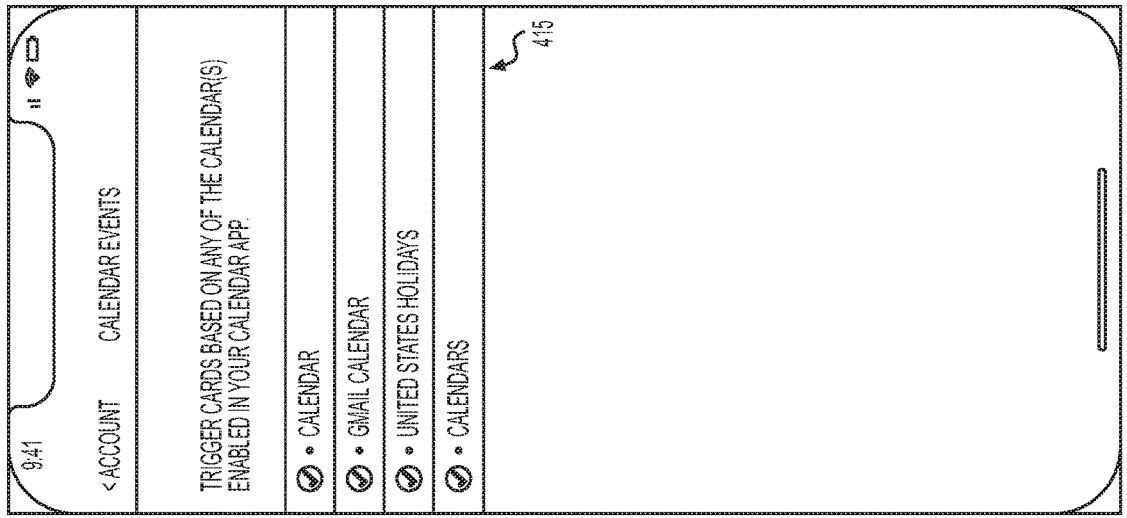
FIGS. 4A-4C depict exemplary user interfaces for setting up the parsing of calendar data, according to one aspect of the present disclosure.
Figure 4B:
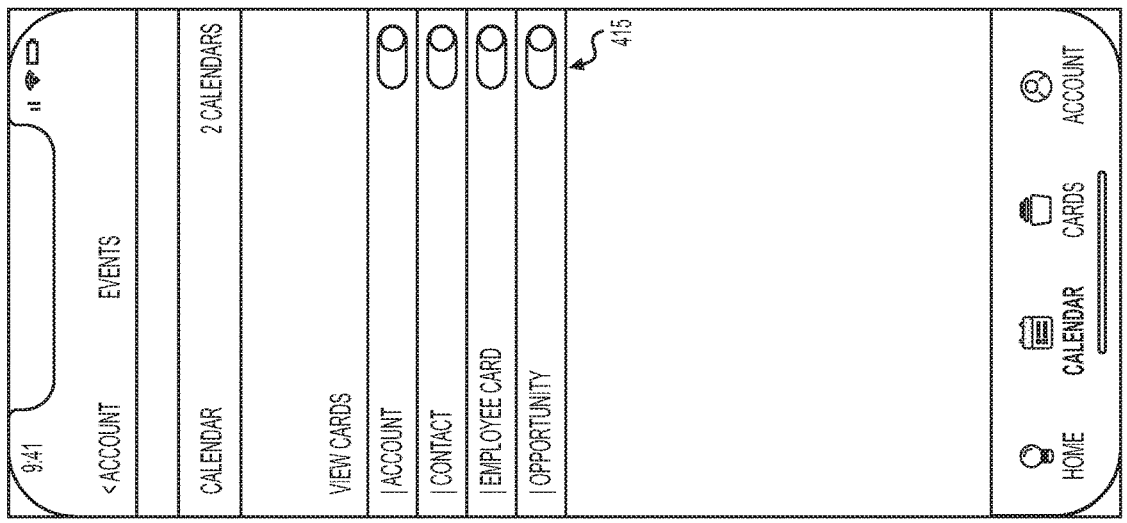
Figure 4C:
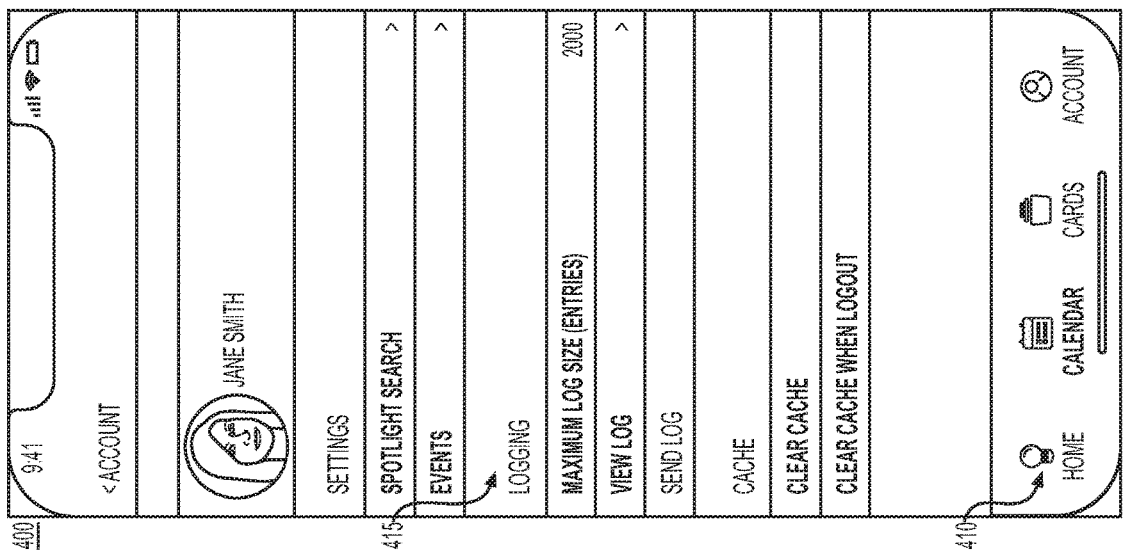

FIGS. 4A-4C depict exemplary user interface 400 for setting up the parsing of calendar data, according to one aspect of the present disclosure. FIGS. 4A-4C may include settings window 415, and bottom navigation bar 410. At the setup process for application 120 the user may be asked to set up preferences on the types of data cards that the user would like to see, and also to grant permissions to the individual email accounts for the application 120 to access calendar data. In FIG. 4B, the exemplary setup process may be displayed for the user to select the types of data cards in settings window 415 being displayed by the application 120. The types of data cards may include account, contact, employee card, and opportunity. Other types of data cards may be made available based on the user or on the calendar data. In FIG. 4C, the exemplary setup process may be displayed for the user to select the calendars to which the application 120 may have permission to access, retrieve, and parse the calendar data.

Figure 5B:
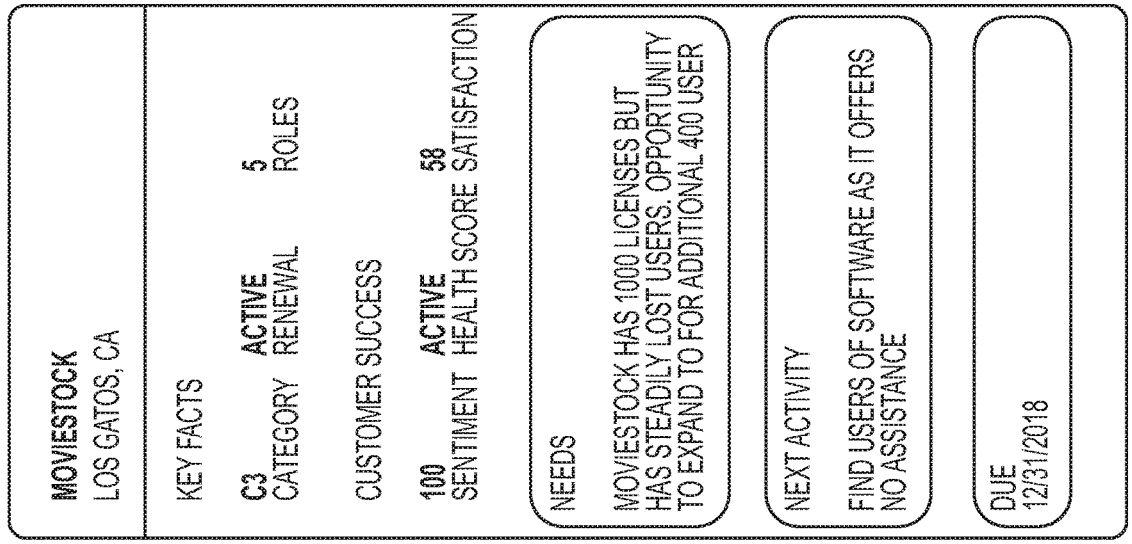
FIGS. 5A and 5B depict exemplary user interfaces for displaying and interacting with application notification of calendar data, according to one aspect of the present disclosure.
Figure 5A:
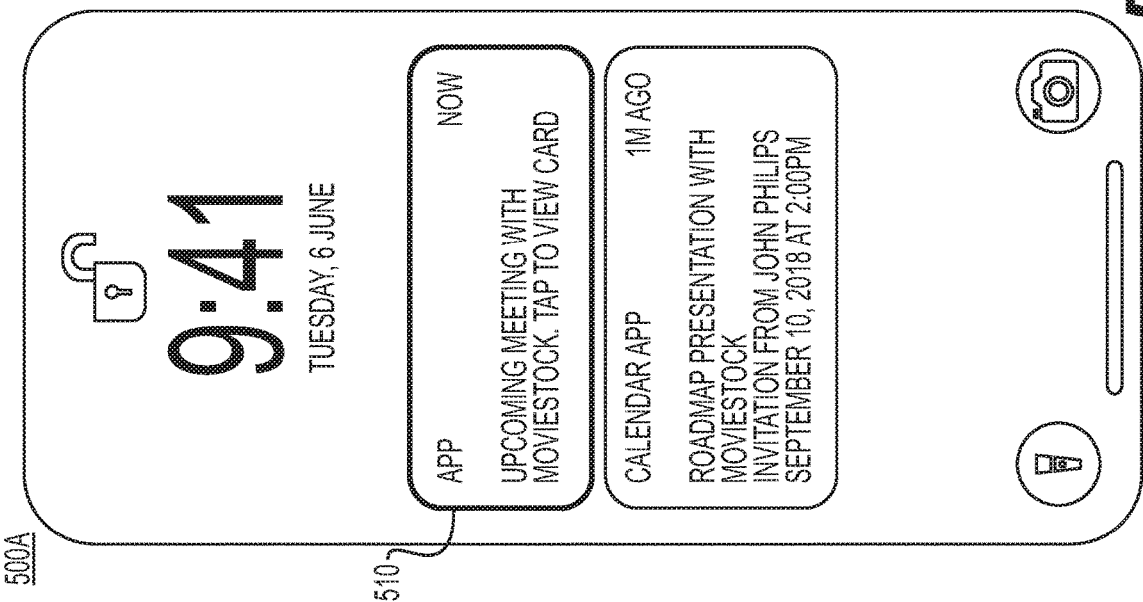

FIGS. 5A and 5B depict exemplary user interfaces 500A and 500B for displaying and interacting with application notification of calendar data, according to one aspect of the present disclosure. User interface 500A may include application notification 510 as depicted in FIG. 5A and user interface 500B may include data card 515 as depicted in FIG. 5B. User interface 500A may be presented while the user device 110 may be in an unused or locked state. Data card 515 maybe created from a calendar entry. Upon receiving the data card 515, the application 120 may cause the user device 110 to display a notification 510 on the user device 110. The notification 510 may be displayed on the lock screen where system notifications are displayed to a user before he/she logs into the client device 110. The notification 510 may be handled by the operating system of the client device 110 and configured to prevent sensitive information of the data card 515 to be displayed on the lock screen. For example, notification 510 may identify that a data card is available for access on the user device 110 without actually displaying the information that is included in the data card. A user may interact with the notification 510 to access the sensitive information that is actually included in the data card 515.

Furthermore, the application 120 may configure the user device 110 to display the notification 510 independently of other system notifications, such as a notification for the calendar application identifying the upcoming calendar appointment. This option may allow the user to view the data card as a supplement to calendar notifications for a calendar event.

Once the notification 510 is presented to the user, the user may interact with the notification and the data card 515 may then be presented to the user. The data card 515 may be presented to the user via an interface of the application 120. For example, once the user interacts with the notification 510, the user device 110 may be configured to execute the application 120 and present the data card 515 through the application. Alternatively, the client device 110 may present the data card 515 as a pop-up window that runs in the operating system of the client device 110 without launching the application 120.

In some implementations, the data card 515 may be passively displayed on the user device 110 at a designated point in time without requiring the user to interact with the notification 510. For example, if the user is logged into the user device 110 and actively using the device, the user device 110 may be configured to present the data card 515 at a predetermined time before (e.g., five minutes) before, or at the start time of, the calendar entry. In this way, data card 515 may be presented without requiring the user to perform any additional actions on the user device 110, which may allow the user to access relevant information, e.g., key facts and metrics for an entity, without requiring the user to search for the information or perform actions to display the information.

Figure 6B:
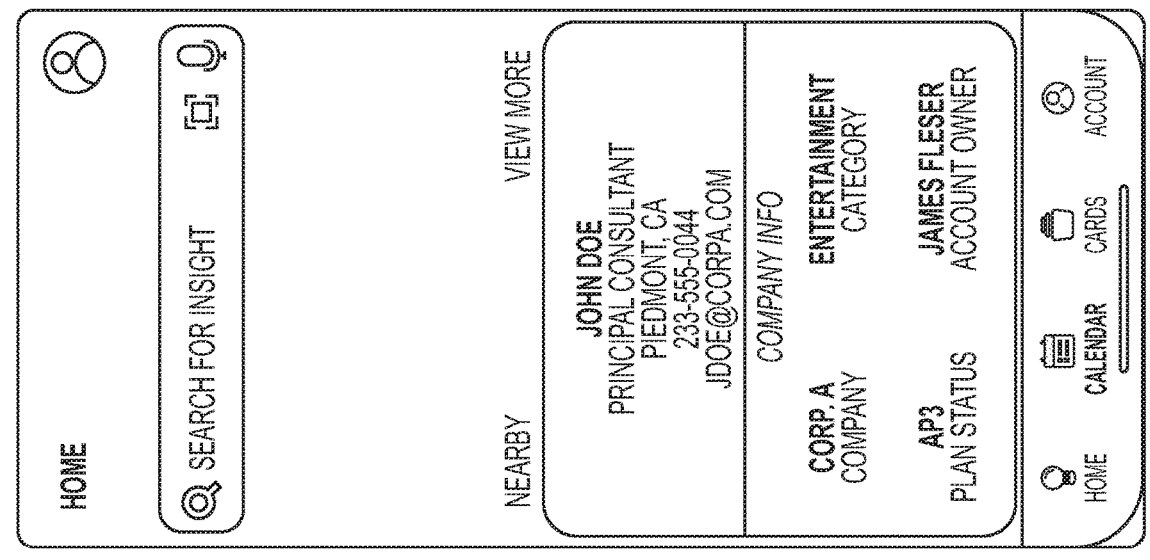
FIGS. 6A and 6B depicts exemplary user interfaces for displaying and interacting with application notification of calendar location data, according to one aspect of the present disclosure.
Figure 6A:
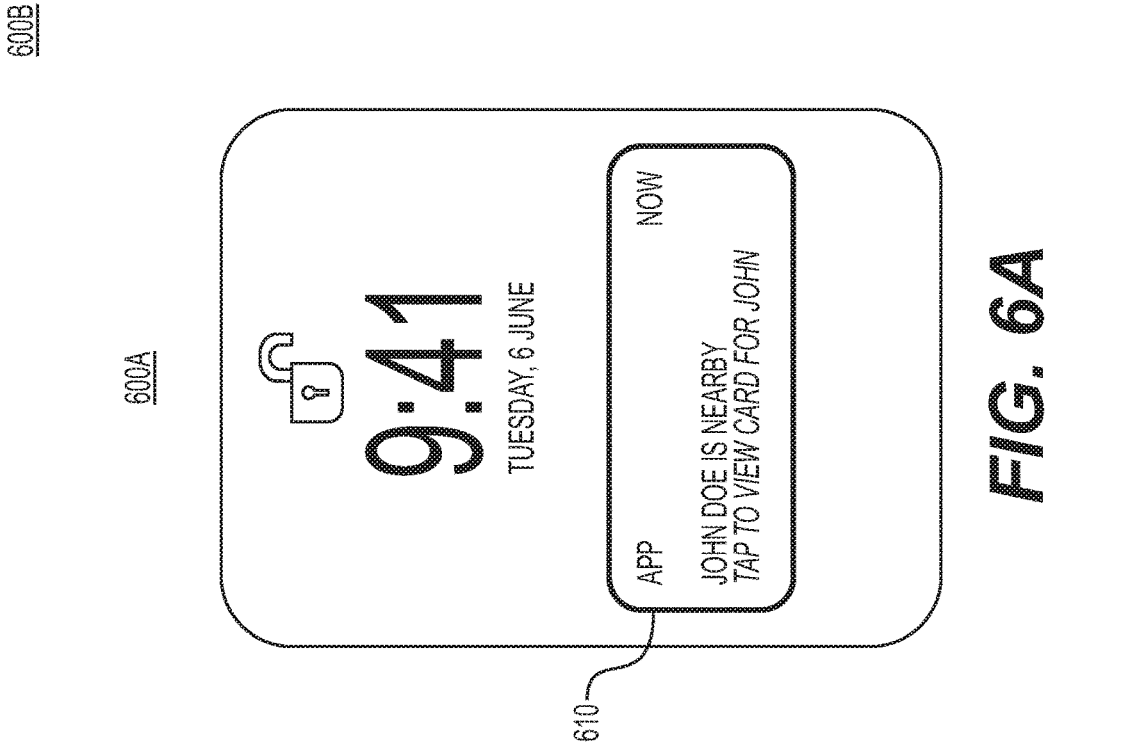

FIGS. 6A and 6B depict exemplary user interfaces 600A and 600B for displaying and interacting with an application notification of calendar location data, according to one aspect of the present disclosure. User interface 600A may include application notification 610 as depicted in FIG. 6A and user interface 600B may include data card 615 as depicted in FIG. 6B. User interface 600A may be presented while the user device 110 may be in an unused or locked state. In some embodiments, application 120 may be able to parse calendar data for location information. For example, the calendar entries may include a location for the meeting, such as a room number or an address. The application 120 may be able to determine the location information and create data cards to display relevant information related to the location. User interface 600B may be an example of a data card being presented on the user device 110 once the user device 110 is detected at a location nearby a point of interest associated with the data card.

In the embodiment, application 120 may monitor location data of the user device 110 and determine if the user device 110 is presently located within a predetermined distance of a point of interest associated with data cards. In FIGS. 6A and 6B, the application 120 may determine that the user device 110 is located nearby a known device of entity "JOHN." Application 120 may determine that the device under the operation of "JOHN" may be associated with information cards that are stored in the card database 150. Application 120 may identify relevant data cards by searching for information such as "JOHN" and identifying data card 615 which may include information relating to the employment data of "JOHN". The application 120 may cause user device 110 to display a notification 610 on the screen of the user device 110. The notification 610 may be displayed on the lock screen where system notifications are displayed to a user before he/she logs into the client device 110. The notification 610 may be handled by the operating system of the user device 110 and configured to prevent sensitive information of the data card 615 from being displayed on the lock screen. For example, notification 610 may identify that a data card is available for access on the user device 110 and that John is nearby the location of the user device 110 without actually displaying the information that is included in the data card. A user may interact with the notification 610 to access the sensitive information that is actually included in the data card 615.

Once the notification 610 is presented to the user, the user may interact with the notification and the data card 615 that is presented to the user. The data card 615 may be presented to the user via an interface of the application 120. For example, once the user interacts with the notification 610, the user device 110 may be configured to execute the application 120 and present the data card 615 through the application. Alternatively, the client device 110 may present the data card 615 as a pop-up window that runs in the operating system of the client device 110 without launching the application 120.

In some embodiments, the application 120 adjusts the display of the data card 615 on the user device 110 based on monitoring location data for the user device 110. For example, the application 120 may configure the user device 110 to only display the data card 615 while the location data indicates that the user device 110 is within a threshold proximity to the device operated by John, e.g., 100 meters. If the user device 110 movies away from the device operated by John and is no longer within the threshold proximity, then the application 120 may configure the user device 110 to remove the notification 610 and/or the data card 615 since they are no longer relevant to the present location of the user device 110. In this manner, the application 120 may dynamically monitor location data to determine if other more relevant data cards should be presented on the user device 110 based on the location of the user device 110.

FIG. 6B displays example data cards using location data related to other users. However, other data cards may be created using the location of the user device 110 or locations regarding calendar entries. If the location of a meeting is known, data cards may be created to display points of interest within a threshold proximity to the location. For example, data cards may be created to display points of interest such as restaurants or entertainment that are located around a meeting location, or data cards may be created to display a navigation route to the meeting location, or data cards may be created to display floor plan layouts of the meeting locations.

Figure 7:
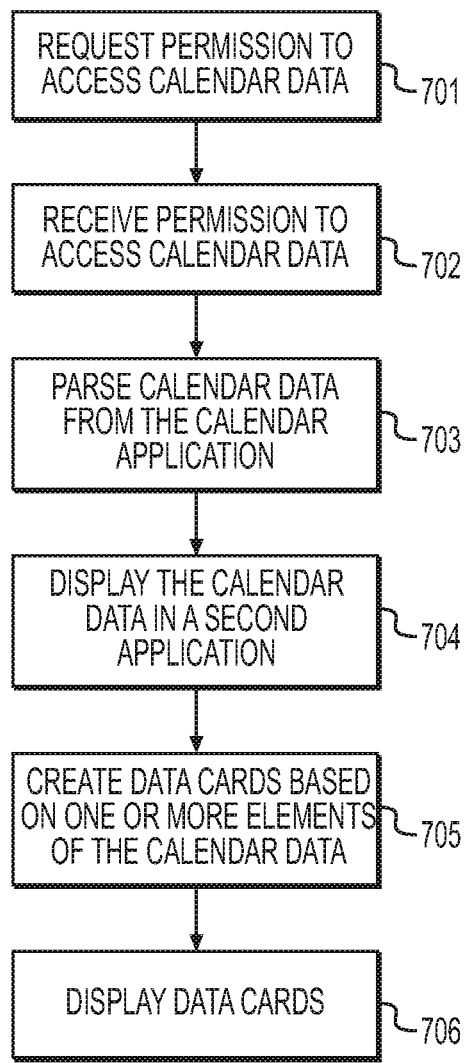
FIG. 7 depicts an exemplary flow diagram of analytics integration into electronic calendars, according to one aspect of the present disclosure.

FIG. 7 depicts an exemplary flow diagram 700 of analytics integration into electronic calendars, according to one aspect of the present disclosure. Diagram 700 may begin at step 701 with the application 120 requesting the user of the user device 110 to grant permission to access the calendar data from calendar application 115. At step 702, application 120 may receive permission from the user to access calendar data from the calendar application. Upon receiving permission, at step 703, application 120 may access the calendar data and parse the data from the calendar application 115. Upon receiving parsing calendar data, the application 120 may display to the user calendar entries requiring the participation of the user at step 704. At step 705, the application 120 may search the source database 145 to see if relevant contextual data exists for any of the elements of the calendar data. If relevant contextual data exists, for example for an attendee or subject of the meeting, then the application 120 may create data cards that may display the relevant contextual information. At step 706, the user of the user device 110 may view the calendar entries in application 120 and may interact with one or more data cards created by the application 120. The application 120 may then present the data cards to the user for consumption.

Figure 8:
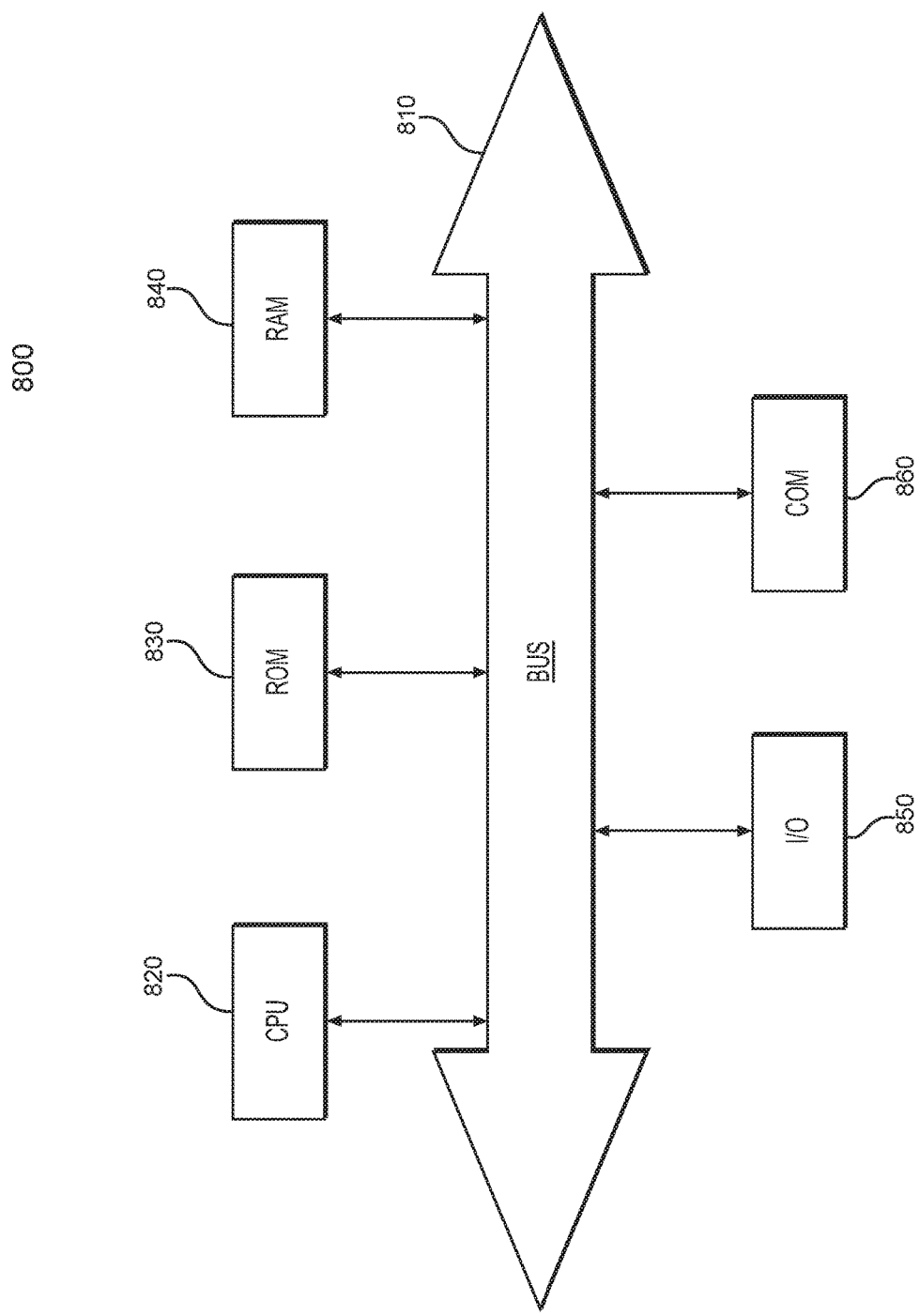
FIG. 8 depicts an exemplary computer device or system, in which embodiments of the present disclosure, or portions thereof, may be implemented.

FIG. 8 depicts a high-level functional block diagram of an exemplary computer device or system, in which embodiments of the present disclosure, or portions thereof, may be implemented, e.g., as computer-readable code. Additionally, each of the exemplary computer servers, databases, user interfaces, modules, and methods described above with respect to FIGS. 1-7 can be implemented in device 800 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-7.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-7, may be implemented using device 800. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 8, device 800 may include a central processing unit (CPU) 820. CPU 820 may be any type of processor device including, for example, any type of special purpose or a general-purpose microprocessor device. As will be appreciated by persons skilled in the relevant art, CPU 820 also may be a single processor in a multi-core/multi-processor system, such system operating alone, or in a cluster of computing devices operating in a cluster or server farm. CPU 820 may be connected to a data communication infrastructure 810, for example, a bus, message queue, network, or multi-core message-passing scheme.

Device 800 also may include a main memory 840, for example, random access memory (RAM), and also may include a secondary memory 830. Secondary memory 830, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 830 may include other similar means for allowing computer programs or other instructions to be loaded into device 800. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 800.

Device 800 also may include a communications interface ("COM") 860. Communications interface 860 allows software and data to be transferred between device 800 and external devices. Communications interface 860 may include a modem, a network interface (such as an Ethernet card), a communications port, a PCMCIA slot and card, or the like. Software and data transferred via communications interface 860 may be in the form of signals, which may be electronic, electromagnetic, optical, or other signals capable of being received by communications interface 860. These signals may be provided to communications interface 860 via a communications path of device 800, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for analytics integration into electronic applications, the method comprising:
providing a request to a user, by a one or more processors, for permission to access electronic data from a calendar event schedule application;
receiving from the user, by the one or more processors, permission to access the electronic data;
parsing, by the one or more processors, the electronic data;
displaying, by the one or more processors, the electronic data in a second application;
creating, by the one or more processors, data cards based on one or more entity terms of the electronic data, wherein the data cards are created by applying the one or more entity terms at a source database distinct from the calendar event schedule application and the second application; and
displaying, by the one or more processors, the data cards in the second application based on a user interaction with the one or more entity terms of the electronic data.

2. The computer-implemented method of claim 1, further comprising collapsing electronic data in the second application, whereby collapsed electronic data displays less electronic data than un-collapsed electronic data.

3. The computer-implemented method of claim 1, wherein creating data cards based on one or more entity terms of the electronic data further comprises:
selecting, by the one or more processor, a template for the data cards from among at least one of a plurality of templates, each of the at least one of the plurality of templates specifying a different format for the data cards.

4. The computer-implemented method of claim 3, wherein each of the at least one of the plurality of templates specifies a different subset of information fields for data related to the one or more entity terms.

5. The computer-implemented method of claim 1, wherein the entity terms may be at least one of organizer, attendee, time, location, subject, organization and title.

6. The computer-implemented method of claim 1, wherein displaying the data cards comprises causing the second application to launch to display the data cards in a user interface of the second application.

7. The computer-implemented method of claim 1, further comprising: creating by the one or more processors, an actionable user interface of the entity terms with associated data cards created, wherein interaction with the actionable user interface by the user causes the second application to display the data cards.

8. A computer system for analytics integration into electronic applications, the computer system comprising:
at least one memory having processor-readable instructions stored therein; and
at least one processor configured to access the memory and execute the processor-readable instructions, which when executed by the processor configured the processor to perform a plurality of functions, including functions for:
providing a request to a user, by a one or more processors, for permission to access electronic data from a calendar event schedule application;
receiving from the user, by the one or more processors, permission to access the electronic data;
parsing, by the one or more processors, the electronic data;
displaying, by the one or more processors, the electronic data in a second application;
creating, by the one or more processors, data cards based on one or more entity terms of the electronic data, wherein the data cards are created by applying the one or more entity terms at a source database distinct from the calendar event schedule application and the second application; and
displaying, by the one or more processors, the data cards in the second application based on a user interaction with the one or more entity terms of the electronic data.

9. The computer system of claim 8, further comprising the function of collapsing electronic data in the second application, whereby collapsed electronic data displays less electronic data than un-collapsed electronic data.

10. The computer system of claim 8, wherein creating data cards based on one or more entity terms of the electronic data further comprises:
selecting, by the one or more processor, a template for the data cards from among at least one of a plurality of templates, each of the at least one of the plurality of templates specifying a different format for the data cards.

11. The computer system of claim 10, wherein each of the at least one of the plurality of templates specifies a different subset of information fields for data related to the one or more entity terms.

12. The computer system of claim 8, wherein the entity terms may be at least one of organizer, attendee, time, location, subject, organization and title.

13. The computer system of claim 8, wherein displaying the data cards comprises causing the second application to launch to display the data cards in a user interface of the second application.

14. The computer system of claim 8, further comprising the function of creating by the one or more processors, an actionable user interface of the entity terms with associated data cards created, wherein interaction with the actionable user interface by the user causes the second application to display the data cards.

15. A non-transitory computer-readable medium containing instructions for analytics integration into electronic applications, the non-transitory computer-readable medium storing instructions that, when executed by at least one processor, configure the at least one processor to perform:
providing a request to a user, by a one or more processors, for permission to access electronic data from a calendar event schedule application;
receiving from the user, by the one or more processors, permission to access the electronic data;
parsing, by the one or more processors, the electronic data;
displaying, by the one or more processors, the electronic data in a second application;
creating, by the one or more processors, data cards based on one or more entity terms of the electronic data, wherein the data cards are created by applying the one or more entity terms at a source database distinct from the calendar event schedule application and the second application; and
displaying, by the one or more processors, the data cards in the second application based on a user interaction with the one or more entity terms of the electronic data.

16. The non-transitory computer-readable medium of claim 15, further comprising collapsing electronic data in the second application, whereby collapsed electronic data displays less electronic data than un-collapsed electronic data.

17. The non-transitory computer-readable medium of claim 15, wherein creating data cards based on one or more entity terms of the electronic data further comprises:
selecting, by the one or more processor, a template for the data cards from among at least one of a plurality of templates, each of the at least one of the plurality of templates specifying a different format for the data cards.

18. The non-transitory computer-readable medium of claim 17, wherein each of the at least one of the plurality of templates specifies a different subset of information fields for data related to the one or more entity terms.

19. The non-transitory computer-readable medium of claim 15, wherein displaying the data cards comprises causing the second application to launch to display the data cards in a user interface of the second application.

20. The non-transitory computer-readable medium of claim 15, further comprising, creating by the one or more processors, an actionable user interface of the entity terms with associated data cards created, wherein interaction with the actionable user interface by the user causes the second application to display the data cards.

* * * * *